Oct. 2, 1934.   H. W. NIEMAN   1,975,473
FRICTION CONTROLLING APPARATUS
Filed March 26, 1932   2 Sheets-Sheet 1
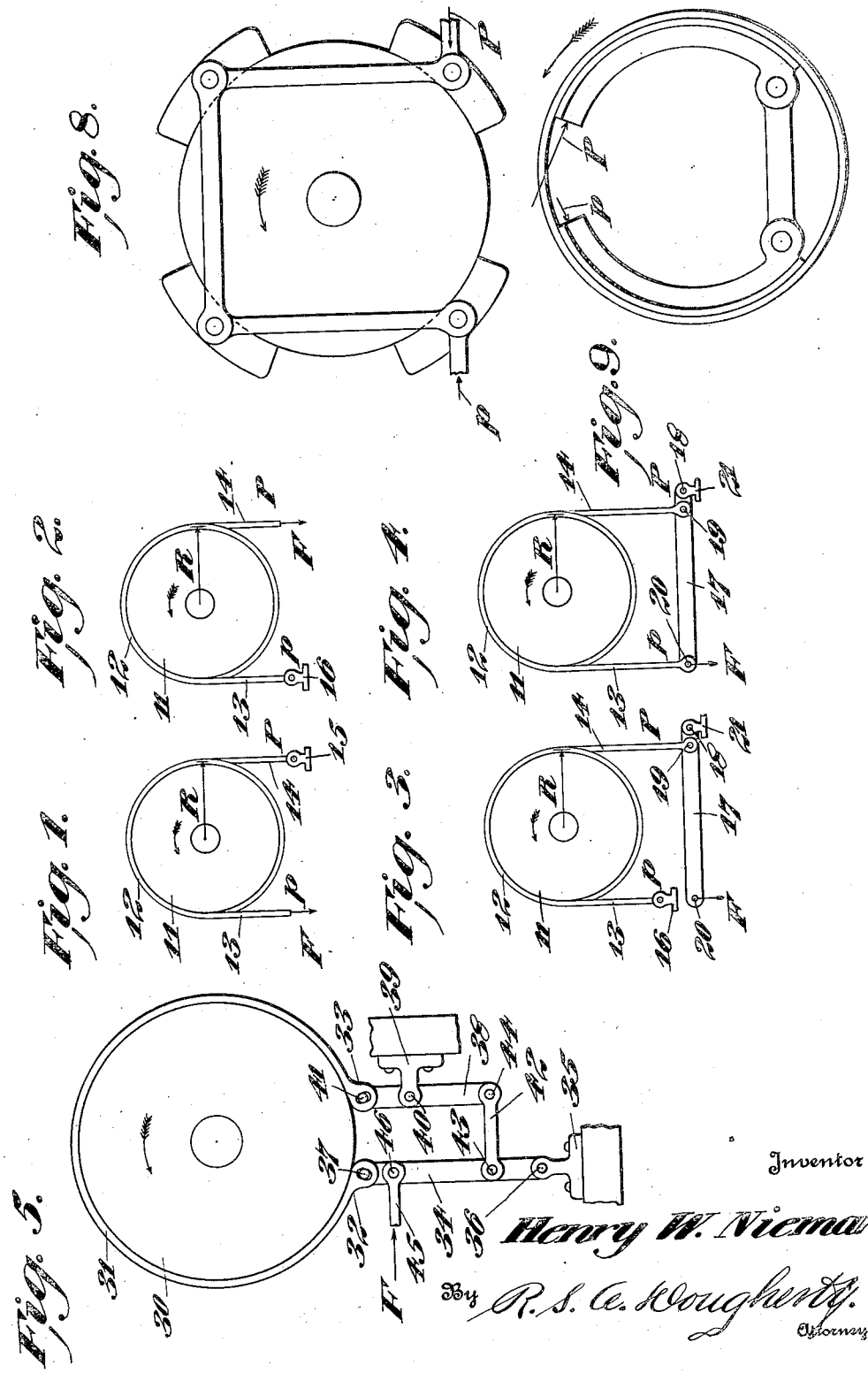

Oct. 2, 1934.   H. W. NIEMAN   1,975,473
FRICTION CONTROLLING APPARATUS
Filed March 26, 1932   2 Sheets-Sheet 2
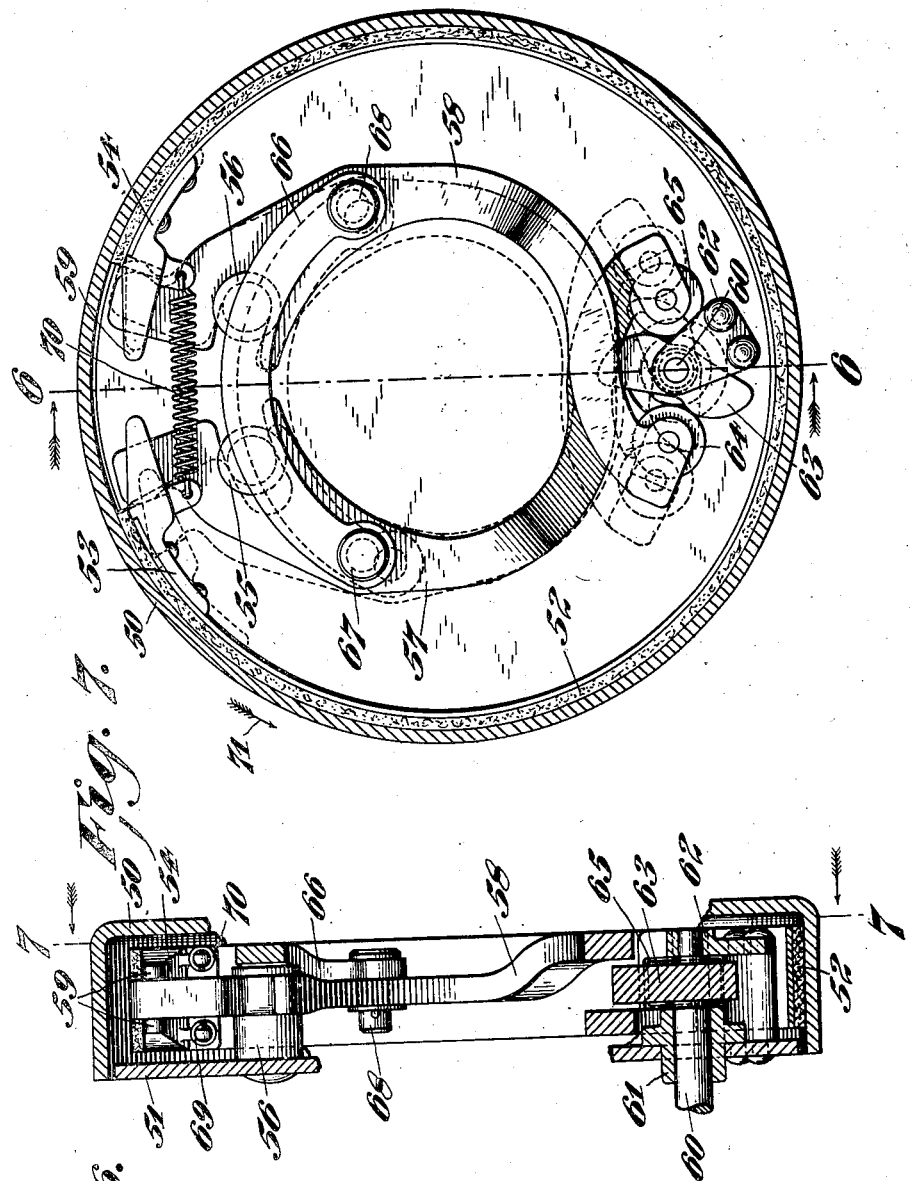
Inventor
Henry W. Nieman.
By R. S. C. Dougherty.
Attorney

UNITED STATES PATENT OFFICE 1,975,473

FRICTION CONTROLLING APPARATUS

Henry W. Nieman, Bethlehem, Pa., assignor to Bethlehem Steel Company, a corporation of Pennsylvania Application March 26, 1932, Serial No. 601,366

9 Claims. (Cl. 188—78)

This invention relates to friction controlling apparatus for use in connection with brakes, clutches and the like for the purpose of securing a powerful frictional engagement with a small externally applied force, a relatively small total movement of the point at which the external force is applied and a torque of frictional engagement which shall be reasonably constant for a given externally applied force in spite of wide changes in the coefficient of friction of the frictioning surfaces. The manner in which these and other advantages are obtained will be understood from the following description taken in connection with the drawings in which:

Figs. 1-3 are diagrammatic representations of devices illustrating certain theoretical principles.

Fig. 4 is a diagrammatic representation of a device embodying the present invention.

Fig. 5 is a diagrammatic representation of another device embodying the present invention.

Figs. 6 and 7 represent an automobile brake built according to the present invention.

Figs. 8 and 9 represent alternative designs of friction members.

In each of Figures 1-4, 11 is a brake drum, revolving in the direction shown by the arrow, 12 is a wrapping friction member of average radius, R, which engages the drum for one and a half turns and terminates at 13 and 14, which are designated as control and work ends respectively. According to the laws of wrapping friction, if $p$ and $P$ are the tangential forces exerted on the control and work ends, the following ratio will exist:

$$\frac{P}{p} = e^{\mu\alpha}$$

where $e$ is the base of natural logarithms, $\mu$ is the coefficient of friction and $\alpha$ the angle of wrap expressed in radians, in this case $3\pi$. The braking torque, T, on the drum will in every such case be $R(P-p)$.

Suppose now we use this wrapping friction device as a brake connected as in Fig. 1, with work end, 14, anchored to fixed member 15 and the external force, F, for actuating the brake applied at control end 13. Here $F=p$ and:

$$T = R(P-p) = FR(e^{\mu\alpha}-1)$$

Assuming a 100 lb. external force is applied and the drum radius is one foot, $$T(\text{lb. ft.}) = 100(e^{3\pi\mu}-1)$$

The first column in Table I shows the value of T for various coefficients. It is evident that we here secure a very powerful frictional engagement for a given external force but that there is no approach to constancy, the relative braking torque between extreme cases (coefficients of 0.4 and 1.0) being as 1 to 292.

Table I

| | Coeff. | Fig. 1 | Fig. 2 | Fig. 3 | Fig. 4 |
|---|---|---|---|---|---|
| Braking torque (lb. ft.) for 100 lb. external force with drum 1 ft. radius for the various coefficients of friction listed | 0.4 | 4243 | 97.70 | 1954.0 | 1337.3 |
| | 0.6 | 28470 | 99.65 | 1993.0 | 1862.6 |
| | 0.8 | 188050 | 99.95 | 1999.0 | 1977.9 |
| | 1.0 | 1239040 | 99.99 | 1999.8 | 1996.6 |
| Ratio of braking torques of extreme cases (coefficients 0.4 and 1.0) | | | 1:292.0 | 1:1.023 | 1:1.023 | 1:1.493 |
| Required movement of application of external force for 1″ take-up of band | | | 1.00″ | 1.00″ | 20.00″ | 0.95″ |

In Fig. 2, control end 13 is anchored to fixed member 16 and the external force, F, is applied on work end, 14. Here $F=P$ and:

$$T = R(P-p) = FR\left(1 - \frac{1}{e^{\mu\alpha}}\right)$$

Assuming that, as before, a 100 lb. external force is applied and the drum radius is one foot, $$T(\text{lb. ft.}) = 100\left(1 - \frac{1}{e^{3\pi\mu}}\right)$$

The second column in Table I shows the value of T for the various coefficients. It is evident that we secure here only a small frictional engagement for a given applied force but that the constancy is very great, the relative braking torque between extreme cases (coefficients of 0.4 and 1.0) is as 1 to 1.023.

In order to increase the magnitude of frictional engagement while still maintaining constancy we can use the arrangement shown in Fig. 3. Control end, 13, is anchored as before to fixed member 16 and work end 14 is attached to lever 17 at the point 19. This lever is pivoted at 18 to fixed member 21 and the external force, F, is applied at its outer end, 20. Calling the distance between points 18 and 19, $h$, and between 18 and 20, H, we have $F=Ph/H$ and:

$$T = R(P-p) = FR\frac{H}{h}\left(1 - \frac{1}{e^{\mu\alpha}}\right)$$

Assuming that, as before, a 100 lb. external force is applied and the drum radius is one foot, and that the ratio of the lever is 20 to 1 we have:

$$T(\text{lb. ft.}) = 2000\left(1 - \frac{1}{e^{3\pi\mu}}\right)$$

The third column in Table I shows the value of T for the various coefficients. It is evident that we secure here a powerful frictional engagement for a given applied force and very great constancy. As in the previous case, the relative braking torque between extreme cases (coefficients of 0.4 and 1.0) is as 1 to 1.023. This arrangement, which is in these respects desirable, has, however, one serious drawback which must be considered. In any practical brake it is necessary to provide for a tightening movement of an amount sufficient to take up first the normal clearance which exists in the free position, second the additional clearance which develops with wear of the bands and other parts and third the stretch and deflection of the various parts under the applied load. In a given case it may be desirable to allow for these factors a movement of one inch as measured at one of the band ends. Now in the cases of Figs. 1 and 2 the movement of the applied force will also be an inch since the force acts directly on the band end. In the case of Fig. 3, however, the point of application of the external force is at the end of the lever and will therefore move twenty times as much as the band end, that is 20 inches. The practical objection to such a movement is obvious even though it is shortened as much as possible by cutting down clearances, and providing adjustments to take up wear.

In Fig. 4 work end 14 is as before attached to lever 17 at 19, the lever being pivoted at 18 to fixed member 21. The external force is as before applied at the outer end 20 of this lever, but in this case we also attach control end 13 of the friction band to the lever at this same point. Giving the same significance as above to the letters $h$, and $H$ we have, $$F = p + P\frac{h}{H}$$

and:

$$T = R(P-p) = FR\frac{e^{\pi\alpha}-1}{1+\frac{h}{H}e^{\mu\alpha}}$$

Assuming that as before 100 lb. external force applied, the drum radius is one foot and the ratio of the lever is 20 to 1 we have:

$$T(\text{lb. ft.}) = 100\frac{e^{\pi\mu}-1}{1+.05e^{3\pi\mu}}$$

The fourth column in Table I shows the value of T for the various coefficients. It is evident we secure here a powerful frictional engagement for a given applied force and a very fair degree of constancy. The relative braking torque between extreme cases (coefficients of 0.4 and 1.0) is as 1 to 1.493. At the same time the movement of the end of the lever to which the external force is applied for a one inch take-up of the band will be less than an inch since the full amount of the movement of point 20 is applied on control end 13 and at the same time a lesser amount, dependent on the leverage ratio, on work end 14. In the assumed case point 20 must move about 0.95″ for a one inch take-up of the band.

The particular advantages of the construction of Fig. 4, which is one embodiment of the present invention, are obvious. It does not give as powerful a frictional engagement for the same applied force as the scheme of Fig. 1, nor does it give the extreme constancy of the schemes of Figs. 2 and 3, but it secures each of these qualities to a very substantial degree, and at the same time keeps the total necessary movement of the point of external force application a minimum.

At this point we will develop a general formula which is not subject to certain of the limitations which have been stated or implied in the above discussion. We will merely assume that we have a wrapping friction member, which may be external or internal to a drum, and that tangential forces P and $p$ are applied to its work and control ends respectively, by means of mechanical connections from a point at which an external force acts, and that a movement of the external force through unit length, measured along the direction of the force, will simultaneously cause tangential movements of length D on the work end of the band and length $d$ on the control end, both of such movements being in such direction as to tighten the band against the drum. We can then write $DP + dp = F$, since the energy of the force, F, through unit length must be equal to the sum of the energies of the other forces through their own lengths of movement. Also as previously pointed out:

$$pe^{\mu\alpha} = P \text{ and } T = R(P-p)$$

From these three equations it follows that:

$$T = FR\frac{e^{\mu\alpha}-1}{d+De^{\mu\alpha}}$$

Furthermore if S is the movement necessary at the point of application of the external force to secure unit take-up of the band, then:

$$S = \frac{1}{D+d}$$

These formulas apply to the case of Fig. 4 as well as to more complicated cases which will be described.

If we apply these formulas to theoretical cases we will find that for any desired range of coefficient of friction (say from 0.4 to 1.0) we can by making the angle of wrap indefinitely large secure any desired magnitude of braking torque for a given external force, combined with any desired degree of constancy, and at the same time keep the total movement of the point at which the external force is applied as small as we please. In practical cases, however, a compromise between these desirable qualities must be struck and the proportions of the apparatus designed accordingly. In cases where several wraps can be employed, especially if the changes in the coefficient of friction can be assumed to occur only in the upper ranges, a large ratio between $d$ and D is desirable. In less favorable cases a smaller ratio should be employed. In any case, however, the movement of the control end, $d$, should be substantially larger than that of the work end, D.

Although the derivation given above is complete and entirely sufficient for design purposes it may be helpful to consider the action of the device from another point of view. In the case of Fig. 1 the objection was that for a given external force as the coefficient of friction increased the force on the work end and the braking torque increased to inordinate values. By inserting the lever and changing the case to that of Fig. 4 a certain definite percentage of the force on the work end is reflected back upon and subtracted from the external force and this imposes a limit to its effect. Thus with a leverage ratio of 20 to 1 the force on the work end can never exceed 20 times the external force, since the external force is, under these conditions, completely neutralized. This point of view brings out an important feature of design which was implied but not specifically stated in deriving the formula. It is necessary not only that simultaneous movements in definite ratio be given to control and work ends, but the movement of the work end, at least, should be secured without substantial friction. If as an extreme case, an irreversible eccentric or a screw were employed to move the work end, force would be reflected back during a movement of application of the brake but not during a releasing movement. In an actual design a certain amount of friction will be present as well as other factors which cannot be accurately calculated. The ends of the band will usually be provided with shoes so that the forces are neither applied on the central plane of the band nor exactly tangentially. Other forces are also present due to the springiness of the band itself or the use of additional springs to aid in practical operation.

Fig. 5 shows in diagrammatic form a brake working on similar principles but employing only a single wrap of band. 30 is a brake drum revolving in the direction of the arrow, adapted to be engaged by band 31, the control and work ends of which are designated 32 and 33 respectively. Lever 34 pivoted at 36 to fixed member 35 engages control end 32 of the band at pin 37, while lever 38 pivoted at 40 to fixed member 39, engages work end 33 of the band at pin 41. The band ends which engage pins 37 and 41 are slotted to prevent jamming of the band against the drum. Connecting link 42 is pivoted to levers 34 and 38 at 43 and 44, while thrust rod 45 adapted to receive the external force F, for engaging the brake is pivoted to lever 34 at 46. With these arrangements it follows that a thrust imparted to rod 45 will move control end 32 to the right and work end 33 to the left, both of which movements tend to tighten the band on the drum. The movement of the work end, however, is only a fraction of the movement of the control end, just as was the case in the construction of Figure 4, and the general formula given above will directly apply.

Figs. 6 and 7 show the same principle applied to an internal expanding brake, suitable for use on automobiles. Here 50 is a brake drum attached to the wheel while 51 is a plate attached to a non-rotating part of the axle. Flexible brake band 52 in drum 50 is provided with end shoes 53 and 54. Studs 55 and 56 are rigidly secured to plate 51 and act as pivots for the levers 57 and 58. The upper end of these levers abut against shoes 53 and 54, the shoes being provided with flat radial faces for such abutment and also with projecting ears as shown at 59 to embrace the sides of the lever and center the band axially in the drum. The external force applied at the brake pedal is transmitted through suitable mechanism to rotate shaft 60 in bearings 61 and 62. Integral with this shaft is the double cam shaped member 63 which upon the application of movement to the brake pedal forces roller 64 to the left and roller 65 to the right. Roller 65 is mounted in the lower end of lever 57 and roller 64 in the lower end of lever 58, these levers being bent so as to cross each other without interference. Connecting levers 57 and 58 is link 66 pivoted to the levers by pins 67 and 68. Tension springs 69 and 70 between shoes 53 and 50 tend to pull these shoes together and release the brake band from the drum.

To explain the operation of the device we will assume that in the solid position of the parts as shown the brake band is loose in the drum. Now as the cam is rotated in a clockwise direction, Fig. 7, with the drum revolving in the direction of arrow 71, the parts will move into their dotted positions. Lever 58 will rock about stud 56 as a pivot, the heavy force transmitted to it from shoe 54, which in this case is the work end of the band, holding the notch which serves for a bearing in the lever firmly against the stud. Lever 57, although its roller 65 will move in a practically identical manner, though in a reverse direction, to roller 64 of lever 58, itself executes a movement different from that of lever 58. Owing to the fact that the levers are connected by the rigid link 66, lever 57 will be pushed to the left away from its seat on stud 55 and assume the position shown. The notch in the lever which serves as a bearing on this stud is of such shape that although it permits the lever to move freely to the left it at the same time acts as a guide to prevent vertical displacement. The upper end of lever 57 abutting against shoe 53 which is here the control end of the band is by the above described means given a much greater movement than the upper end of lever 58 abutting against shoe 54 on the work end. The principle of operation here is thus the same as that of the devices shown in Figs. 4 or 5 and the same theoretical treatment applies.

When the drum is revolving in the opposite direction from arrow 71 the heavy pressure of the band comes against the end of lever 57 from shoe 53 which is now the work end of the band. Lever 57 is therefore forced against and rocks on stud 55, upon actuation of the cam, and lever 58 is pushed to the right away from stud 56 by link 66. Under these conditions shoe 54 which is now the control end of the band will execute a greater motion than shoe 53, the work end. Thus the effect of the brake is exactly the same in this case as it was in the other direction of revolution.

The previously described mechanisms have made use of the wrapping friction of flexible bands. The principles of this invention will apply, however, when using other types of friction elements. Fig. 8 shows an arrangement of four shoes connected by links. Fig. 9 shows a member comprising two rigid shoes and a connecting link. The theory of such devices has been thoroughly developed in relation to various commercial brakes and need not concern us here. The action is similar to that of a flexible band in that a small force applied at $p$ will develop a large force at P and the relation between these forces varies widely as the coefficient of friction changes. The construction of Fig. 8 could obviously be used in place of the band in Fig. 5, while that of Fig. 9, with slight adaptation could replace the band in Figs. 6 and 7.

The friction members that have been described fall into a clearly defined class although no descriptive term for them exists. They will hereinafter be referred to as "servo-friction" members, a term which shall be understood to imply the following characteristics: There are two points of force application which will be called "connection elements"; a definite ratio exists between the forces at these two elements dependent on the coefficient of friction, the element of the greater force will be called the "work element" and that of the lesser force the "control element"; the member can be caused to engage or disengage the surface against which it is designed to friction by a movement imparted to either one of the elements with the other held at rest.

Having thus described my invention, what I claim as new and desire to secure by Letters Patent is:

1. In a mechanism, a servofriction member, first and second connection elements comprising parts of said servofriction member, a second member having a friction surface, said servofriction member and said second member being adapted to have a relative rotation and to frictionally engage one another, whereby such rotation causes the transmission of forces to said connection elements, the first of said connection elements acting as the work element and the second of said connection elements acting as the control element when said relative rotation is in one direction, and the first of said connection elements acting as the control element and the second of said connection elements acting as the work element when said relative rotation is in the reverse direction, an actuating member, means to apply an external force to said actuating member, mechanism adapted to transmit a predetermined proportion of the force on the control element to said actuating member to oppose said applied external force, and mechanism adapted to transmit a predetermined proportion of the force on the work element to said actuating member to further oppose said applied external force, said second mentioned predetermined proportion being substantially smaller than said first mentioned predetermined proportion.

2. In a brake, a drum member adapted to rotate, a servofriction member adapted to engage said drum member and comprising two connection elements, lever members engaging each of said connection elements respectively, an actuating member, means to apply an external force on said actuating member to act on and swing each of said lever members simultaneously, a link connecting said lever members, a fulcrum member for each of said lever members, one of said fulcrum members acting as a fulcrum for its respective lever member during one direction of rotation of said drum member and the other of said fulcrum members acting as a fulcrum for its respective lever member during the reverse direction of rotation of said drum member, whereby upon the action of said external force one of the said connection elements is acted upon by a major portion of said force and is given a movement, and another of said connection elements is acted upon by a minor portion of said force and is given movement substantially greater than the movement of the other connection element.

3. In a device, a first member having a friction surface, a servofriction member adapted to be given relative rotation to and to frictionally engage with said first member, said servofriction member comprising first and second connection elements, a movable actuating member, means to apply an external force to said actuating member, means to engage said actuating member with said connection elements so that movement of the actuating member will simultaneously apply a tangential movement to the first of said connection elements and a substantially greater tangential movement to the second of said connection elements, and means acting to alter the effect of said aforesaid means upon reversal of the direction of said relative rotation whereby the movement of the actuating member causes a substantially greater tangential movement of said elements to the first of said connection elements than to the second.

4. In a braking device, a movable member to be retarded, a contractible and expandible element to frictionally engage said member, a plurality of levers to engage said element at spaced points, a plurality of fulcrum members to be used selectively by each of said levers, means to apply simultaneous movement to said levers and to said spaced points to expand said element, and means actuated by said movable member to select said fulcrum members.

5. In a brake device, a drum member, a friction member, levers engaging said friction member, a link pivoted to said levers, pivot means for rotatably and slidingly supporting each of said levers, and a camming member between said levers whereby upon actuation of said camming means one of said levers rotates about said pivot means and the other of said levers slides upon said pivot means.

6. In a brake device, a drum member, a friction member, levers engaging said friction member, means for rotatably and slidingly supporting said levers, a cam member between said levers, and a link hinged to said levers at points intermediate said means and said cam member.

7. In a brake device, a drum member, a friction member, levers engaging said friction member and each having an elongated slot formed therein, supporting means in said slots, means for operating said levers to cause the friction member to engage said drum, and a link hinged to said levers.

8. In a device, a drum member, an expandible and contractible member, a pair of levers engaging the latter member and each having an elongated slot formed therein, means engaging said slots for supporting said levers, means including said levers for expanding and contracting the second mentioned member, and a link pivoted to said levers.

9. In a device, a drum member, an expandible and contractible member, a pair of levers engaging the latter member, a bearing member rotatably supporting each lever while permitting lateral movement thereon, said levers intersecting each other at their free ends, a link hinged to said levers intermediate their ends, and a camming device between the ends of the levers.

HENRY W. NIEMAN.

Certificate of Correction

Patent No. 1,975,473. October 2, 1934.

HENRY W. NIEMAN

It is hereby certified that errors appear in the printed specification of the above numbered patent requiring correction as follows: Page 2, line 43, strike out the upper right-hand part of the equation "$e^{\tau\alpha}-1$" and insert instead $e^{\mu\alpha}-1$; and line 50, for "$e^{\tau\mu}-1$" read $e^{3\tau\mu}-1$; and that the said Letters Patent should be read with these corrections therein that the same may conform to the record of the case in the Patent Office.

Signed and sealed this 6th day of November, A. D. 1934.

[SEAL] LESLIE FRAZER,
*Acting Commissioner of Patents.*